(12) United States Patent
Chakraborty et al.

(10) Patent No.: US 10,575,199 B2
(45) Date of Patent: Feb. 25, 2020

(54) SYSTEM AND METHOD FOR PERFORMING OVER-THE-AIR TESTING OF DEVICE UNDER TEST

(71) Applicant: Keysight Technologies, Inc., Santa Rosa, CA (US)

(72) Inventors: Kaushik Chakraborty, Penang (MY); Darrin Russell, Bowie, TX (US); Brian Chi, Taoyuan (TW)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/024,179

(22) Filed: Jun. 29, 2018

(65) Prior Publication Data
US 2020/0008085 A1    Jan. 2, 2020

(51) Int. Cl.
*H04W 24/08* (2009.01)
*H04L 12/26* (2006.01)
*H04W 8/00* (2009.01)
*H04W 4/80* (2018.01)
*H04W 76/10* (2018.01)

(52) U.S. Cl.
CPC ......... *H04W 24/08* (2013.01); *H04L 43/0823* (2013.01); *H04W 4/80* (2018.02); *H04W 8/005* (2013.01); *H04W 76/10* (2018.02)

(58) Field of Classification Search
CPC ....... H04W 24/08; H04W 76/10; H04W 4/80; H04W 8/005; H04L 43/0823
See application file for complete search history.

(56) References Cited

U.S. PATENT DOCUMENTS

| 10,007,241 | B1* | 6/2018 | Hedin | G05B 15/02 |
| 2014/0194069 | A1* | 7/2014 | Liu | H04W 24/00 455/67.14 |
| 2016/0352611 | A1* | 12/2016 | Olgaard | H04L 43/50 |

OTHER PUBLICATIONS

ZigBee Alliance, Bluetooth Core Specification, v5.0 (Dec. 6, 2016), https://www.bluetooth.com/specifications/bluetooth-core-specification, title and table of content page, pp. 1-75.
ZigBee Alliance, ZigBee PRO 2015 Specification (Aug. 5, 2015), pp. 1-565.
Keysight X8711A IoT Device Functional Test Solution User's Guide, Keysight Technologies, Edition 1, Jun. 2018, pp. 1-4.

* cited by examiner

*Primary Examiner* — Dady Chery

(57) ABSTRACT

A method is provided for performing over-the-air (OTA) testing of a device under test (DUT). The method includes establishing an OTA connection with the DUT, while the DUT is in signaling mode, the OTA connection including advertising channels and data channels; sending universally unique identifier (UUID) requests at different transmit powers to the DUT over the data channels of the OTA connection; receiving UUID responses from the DUT over the data channels of the OTA connection in response to at least some of the UIDD requests; and determining a packet error rate (PER) for the received UUID responses from the DUT based on a ratio of a number of received responses and a number of sent connect requests. The determined PER indicates sensitivity of a receiver in the DUT.

20 Claims, 7 Drawing Sheets

| Advertising Event Type | Type of PDU being responded to | Allowable response PDUs | | | |
|---|---|---|---|---|---|
| | | SCAN_REQ | CONNECT_IND[1] | AUX_SCAN_REQ | AUX_CONNECT_REQ |
| Connectable and Scannable Undirected Event | ADV_IND | YES | YES | NO | NO |
| Connectable Undirected Event | ADV_EXT_IND | NO | NO | NO | NO |
| | AUX_ADV_IND | NO | NO | NO | YES |
| Connectable Directed Event | ADV_DIRECT_IND | NO | YES[2] | NO | NO |
| | ADV_EXT_IND | NO | NO | NO | NO |
| | AUX_ADV_IND | NO | NO | NO | YES[2] |
| Non-Connectable and Non-Scannable Undirected Event | ADV_NONCONN_IND | NO | NO | NO | NO |
| | ADV_EXT_IND | NO | NO | NO | NO |
| | AUX_ADV_IND | NO | NO | NO | NO |
| Non-Connectable and Non-Scannable Directed Event | ADV_EXT_IND | NO | NO | NO | NO |
| | AUX_ADV_IND | NO | NO | NO | NO |
| Scannable Undirected Event | ADV_SCAN_IND | YES | NO | NO | NO |
| | ADV_EXT_IND | NO | NO | NO | NO |
| | AUX_ADV_IND | NO | NO | YES | NO |
| Scannable Directed Event | ADV_EXT_IND | NO | NO | NO | NO |
| | AUX_ADV_IND | NO | NO | YES[3] | NO |

FIG. 4

SYSTEM AND METHOD FOR PERFORMING OVER-THE-AIR TESTING OF DEVICE UNDER TEST

BACKGROUND

Due to widespread availability of miniature processors and circuits for connecting to wireless networks, increasing numbers of devices are able to connect wirelessly with communication networks, such as the Internet. For example, electronic circuitry may be embedded in various types of devices ("things"), enabling communication with these devices over the Internet for any number of purposes, such as tracking, maintaining, updating and/or controlling the devices, or using the devices for remote sensing, monitoring, imaging, surveillance and/or data sharing, for example. The devices configured to communicate over the Internet may be referred to as Internet of Things (IoT) devices.

Typically, IoT devices are coin cell powered and very small in size. Accordingly, printed circuit boards (PCBs) that contain circuitry for establishing and maintaining wireless network connections and Internet communications (as well as for device control, in some instances) may be densely populated and have very complex layouts. Also, when the devices require manual assembly of radio frequency (RF) circuitry, power circuitry and the like, the difficulty of obtaining precise performance measurements and characteristics increases after final assembly. This is particularly problematic in that there is a relatively high chance of human error during the assembly process.

For manufacturing and quality assurance purposes, the PCBs include test points, as well as custom jigs, to create connections between the test points and external communication paths (e.g., HCl communication serial buses, and the like), in order to test various characteristics of the devices. The manufacturers also may need test mode firmware in the devices to accommodate the various tests. As these devices are typically inexpensive and quite small, they may or may not include sufficient memory (e.g., flash memory) to store both test mode and normal operational firmware. Therefore, during production, the manufacturers may need to perform extra steps in order to download test mode firmware for device testing purpose, and then download normal operational firmware for shipping the devices to end users. The extra steps require increased production time and complexity, resulting in increased expensive. Also, manufacturers may not have access to the test mode firmware, in which case they must contact the device (e.g., chip) manufacturer to support and/or provide the test mode firmware, which also can lead to increased production time and costs. These same issues are faced by end users that perform their own device testing.

Many IoT devices implement Bluetooth® low energy (BLE) wireless communication technology to enable connection to BLE wireless personal area networks (PANs) and ultimately to the Internet. A recent version of the BLE specification is BLE version 5.0, which provides for 40 physical channels in the 2.4 GHz ISM band, each separated by 2 MHz. BLE 5.0 defines two types of transmissions: advertising and data transmissions. Therefore, of the 40 channels, three are dedicated to advertising and 37 are dedicated to data. Also, many IoT devices implement ZigBee wireless communication technology to enable connection to ZigBee wireless PANs and ultimately to the Internet. A recent version of the ZigBee specification is ZigBee version 3.0, which provides for 16 physical channels from 2405 MHz to 2480 MHz, each separated by 5 MHz. ZigBee transmits and receives in a fixed channel(s), as opposed to channel hopping.

However, for device testing (e.g., in accordance with BLE and/or ZigBee specifications), only test mode non-signaling measurements are available. The non-signaling measurements require control by physical wire connection with the test system and the device operating in non-signaling mode. In the non-signaling mode, only modulated or continuous wave (CW) signals are generated. As mentioned above, the devices are typically very small, so they may not have space to populate the test points in the final PCB. Also, flashing of non-signaling firmware in the devices increases production time. Also, after performing tests using non-signaling (test mode) firmware, the manufacturer and/or end user needs to flash back the signaling (operational mode) firmware. The multiple flashings for non-signaling and signaling firmware increases production and testing time.

Accordingly, there is a need for a test system that is able to perform testing of a small device, such as an IoT device, without having to physically connect with the device circuitry (thereby avoiding the need to include test points on densely populated PCBs). The test system also needs to be flexible, since there are many different manufacturers and devices available, which are different in terms of functionality and behavior. So, there is a need for the test system to be able to resolve a diversity of issues without having to create customized firmware or settings for the different manufactures and/or the devices. There also is a need for a test system that is able to test devices that are running normal operational mode firmware, as opposed to test mode firmware.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 4 is a table showing advertising event types, protocol data units (PDUs) used, and allowable response PDUs in accordance with BLE specification.

DETAILED DESCRIPTION

Figure 1:
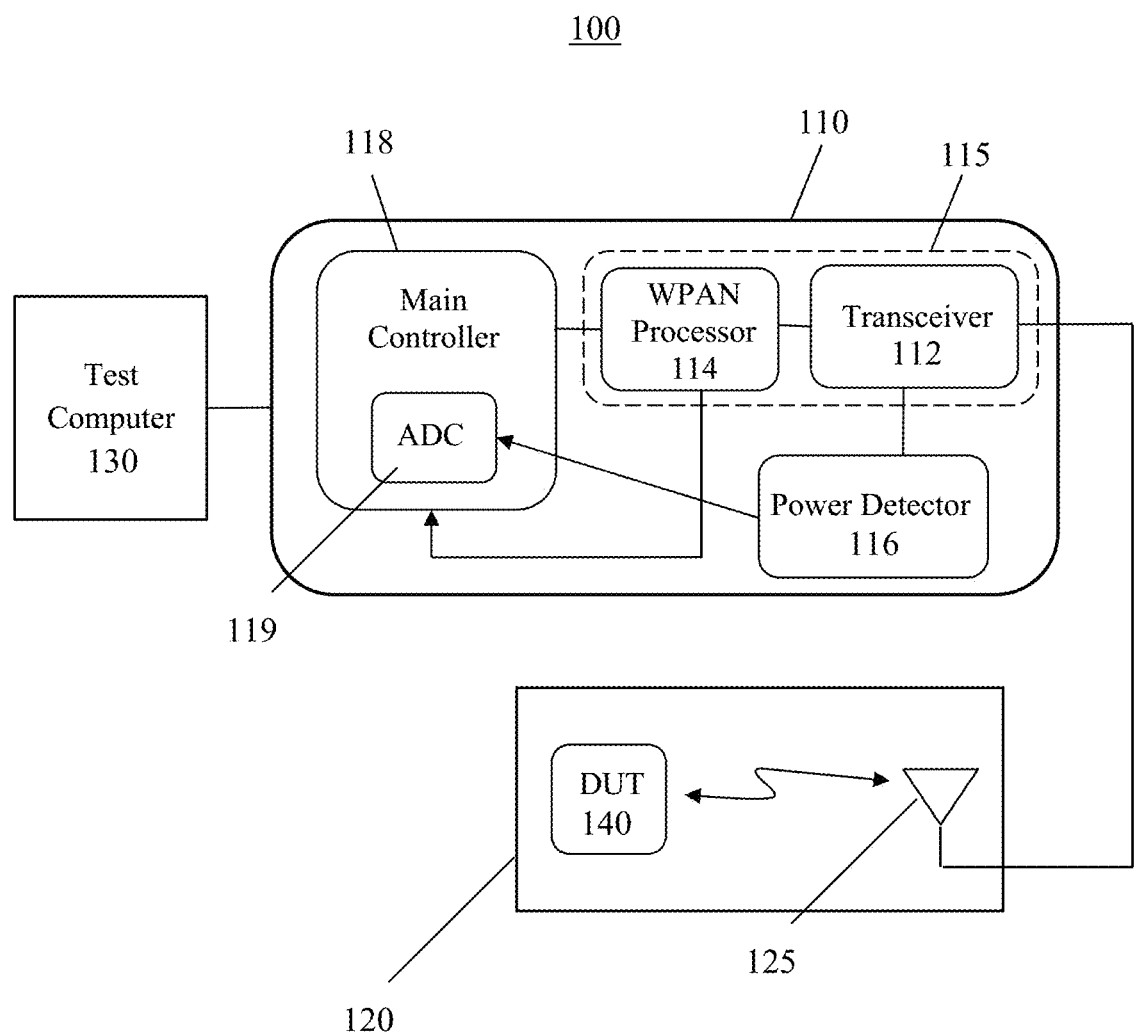
FIG. 1 is a simplified block diagram of a test system that supports over-the-air (OTA) testing of a device under test (DUT), according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

According to various embodiments, a DUT is tested using an OTA test system by treating the DUT as a peripheral device and the test system as a central device in accordance with Bluetooth® low energy (BLE) standards, such as BLE 5.0. It is assumed that the DUT (peripheral device) supports Connectable and Scannable Undirected Event of the advertising event types provided according to the BLE 5.0 standard. Therefore, when the test system (central device) sends a connect request command OTA to the DUT, the DUT connects with the test system without any pass key or security. In this case, however, data communication is not possible. Rather, the exchange of information involves universally unique identifier (UUID) requests as the connect request commands, which may be transmitted at different powers to the DUT over the data channels available to the DUT. More particularly, the OTA test system sends UUID requests (or commands) to the DUT at different power levels, and receives UUID responses from the DUT in response to at least some of the UUID requests. A percentage ratio between the number of UUID requests sent and the number of corresponding UUID responses received provides a Packet Error Rate (PER) of the UUID responses (and thus of the DUT receiver). The data channels may therefore be used to determine RF performance of the DUT.

Also, according to various embodiments, a DUT is tested using an OTA test system by treating the DUT as a Router or End Device and the test system as a Coordinator in accordance with ZigBee standards, such as ZigBee 3.0. Therefore, the test system (Coordinator) sends a unique PAN ID and a link key, derived from install code, to the DUT (Router or End Device), and the DUT connects with the test system when its link key matches. The link key may be default link key code "zigbeealliance09," assigned by the ZigBee Alliance. The link key must be the same for the devices in order to establish a successful communication bridge, enabling the test system to access the application layer of the DUT, e.g., in order to perform PER. Some DUTs may use another set of key(s) on top of the link key (and/or a master key) that must be exchanged in order for associated applications to be accessed, although accessing specific applications is not necessary to perform PER. Generally, the master key is used by ZigBee Link Layer (ZLL) certified products, where a ZLL touchlink initiator encrypts the network key with the master key and transports the encrypted key to a ZLL target. The master key is a secret key shared by all certified ZLL devices. The link key is derived from master key in the ZigBee stack. For additional security, certain ZLL devices may have application specific key(s), which cannot be decrypted by the master key and/or link key. However, as mentioned above, the embodiments do not require access to these DUT application(s). Rather, the link key is used, which enables the communication bridge between test instrument and DUT using network link layer for performing PER, without accessing DUT application(s) requiring additional keys.

Notably, when the DUT does not support any keys other than the link key, data communication between the test system and the DUT is possible at this stage. However, when the DUT does supports key(s) in addition to the link key, data communication is not possible at this stage. Regardless, once communication is established in response to the link key, exchange of information involves status requests, which may be transmitted at different powers to the DUT over the channels available to the DUT. More particularly, the OTA test system sends status requests to the DUT at different power levels, and receives status responses from the DUT in response to at least some of the status requests. A percentage ratio between the number of status requests sent and the number of corresponding status responses received provides a PER of the status responses (and thus of the DUT receiver). The channels may therefore be used to determine RF performance of the DUT.

FIG. 1 is a simplified block diagram of a test system that supports over-the-air (OTA) testing of a device under test (DUT), according to a representative embodiment.

Referring to FIG. 1, test system 100 includes an RF module (or RF card) 110, a test computer 130 and a shield box 120. The test system 100 is configured to perform OTA testing of a DUT 140, which is located in the shield box 120. The shield box 120 may be an anechoic chamber, for example, and includes a coupling antenna 125, which communicates wirelessly with the DUT 140 within the confines of the shield box 120. The RF module 110 is connected to the antenna 125 in order to send and receive RF signals to and from the DUT 140 via the antenna 125. In the depicted embodiment, the RF module 110 has a wired connection to the antenna 125 in the shield box 120, such as a SubMiniature version A (SMA) cable. However, other types of wired connections, as well as wireless connections, may be incorporated without departing from the scope of the present teachings. Of course, if a wireless connection is implemented between the RF module 110 and the antenna 125, the shield box 120 would also include a separate transceiver to accommodate the communication, as would be apparent to one skilled in the art.

The RF module 110 includes a transceiver 112, wireless personal area network (WPAN) processor 114, a power detector 116 and a main controller 118. In the depicted embodiment, the transceiver 112 and the WPAN processor 114 are included on a single chip 115, such as a TI CC2650 available from Texas Instruments, Inc., for example, or other compatible wireless micro-control unit (MCU). However, the transceiver 112 and the WPAN processor 114 may be included on separate chips or modules, without departing from the scope of the present teachings. It is understood that the WPAN processor 114 may be configured in accordance with the BLE standard (e.g., BLE 5.0), the ZigBee standard (e.g., ZigBee 3.0), or both, without departing from the scope of the present teachings. RF module 110 may be a Keysight X8711A IoT Device Functional Test Solution, for example, available from Keysight Technologies, Inc., although other types of RF modules may be incorporated, without departing from the scope of the present teachings.

The transceiver 112 is configured to transmit and receive RF signals to and from the DUT 140 via the antenna 125 in the shield box 120. In a transmit mode, the transceiver 112 modulates data onto an RF signal. The transceiver 112 filters and sends the RF signal to the antenna 125, which transmits (uplinks) the RF signal OTA to the DUT 140. In a receive mode, the transceiver 112 filters and demodulates data from an RF signal sent from the antenna, which receives (downlinks) the RF signal OTA from the DUT 140. The data modulated by the transceiver 112 is provided by the WPAN processor 114 in accordance with a test protocol, and the data demodulated by the transceiver 112 is provided to the WPAN processor 114 for processing, as discussed below.

The WPAN processor 114 is programmed to execute test protocols to determine characteristics of the DUT 140, such as receiver sensitivity of a receiver in the DUT 140. In various embodiments, the WPAN processor 114 complies with the BLE 5.0 specification, designed by the Bluetooth® Special Interest Group (SIG) and/or the ZigBee 3.0 specification, designed by the ZigBee Alliance, as mentioned above. Generally, BLE enables support of substantially the same coverage area at reduced power consumption, as compared to basic rate (BR) Bluetooth® technology. BLE 5.0 is described in part, for example, by Bluetooth Core Specification, v5.0 (Dec. 6, 2016), and ZigBee 3.0 is described in part, for example, by ZigBee PRO 2015 Specification (Aug. 5, 2015), which are hereby incorporated by reference. Of course the above documents are not exclusive, and BLE 5.0 and ZigBee 3.0 are further described in other specifications as well.

As mentioned above, BLE 5.0 provides for 40 physical channels in the 2.4 GHz ISM band. More particularly, the 40 channels start at 2402 MHz and go to 2480 MHz, 2 MHz apart from one another, and the RF signals are Gaussian frequency shift keying (GFSK) modulated. BLE 5.0 provides for three channels (CH37, CH38 and CH 39) dedicated to advertising transmissions, and 37 channels (CH0 to CH 36) dedicated to data transmissions. Advertising refers to transmissions by the DUT 140 indicating its presence in the network. The advertising transmissions may be broadcast, for example, over at least one of the three advertising channels so that the central device (in this case, the RF module 110) is able to detect its presence and establish an OTA connection. The data communications take place over at least one of the 37 data channels, and may include data, control messages and control responses once the OTA connection has been established. In various embodiments, the advertising transmissions are broadcast over all three advertising channels, and the data communications take place over all 37 data channels.

BLE provides for a number of different types of advertising events from the DUT 140, with associated protocol data units (PDUs), respectively. For example, according to BLE 5.0, the advertising event types include Connectable and Scannable Undirected Event, Connectable Undirected Event, Connectable Directed Event, Non-Connectable and Non-Scannable Undirected Event, Non-Connectable and Non-Scannable Directed Event, Scannable Undirected Event, and Scannable Directed Event. For purposes of illustration, FIG. 4 is a table showing the advertising events, the corresponding PDUs used, and allowable response PDUs.

ZigBee 3.0 provides for 16 physical channels in the 2.4 GHz ISM band. More particularly, the 16 channels start at 2405 MHz and go to 2480 MHz, 5 MHz apart from one another, and the RF signals are offset quadrature phase shift keying (OQPSK) modulated. The ZigBee stack software provides the network and applications layers on top of IEEE 802.15.4 physical layer and media access control (MAC) layer. Generally, ZigBee provides for the coordinator (e.g., test system 100) listening for beacon requests sent by one or more routers or end devices (e.g., DUT 140) seeking to join the wireless network. Upon receiving a beacon request, the coordinator responds with a beacon sent over the same channel on which the beacon request was received, and initiate the establishment of a secure network connection, as discussed below.

The power detector 116 captures power of the received RF signals at the transceiver 112, and sends the captured power to the main controller 118. More particularly, in an embodiment, the power detector 116 captures the power of the RF signals comprising the broadcast advertising transmissions. The power detector 116 may be an RF signal to DC converter, for example, which outputs analog signals corresponding to detected power levels of the received RF signals.

The main controller 118 includes a processing unit (not shown) programmed to control certain operations of the RF module 110, and memory that stores programming for the processing unit, as well as data that may be collected during the test process. The main controller 118 further includes an analog to digital converter (ADC) 119, which receives the analog signals corresponding to the detected power levels from the power detector 116, and converts the analog signals to corresponding digital signals for processing by the processing unit in order to determine the power levels.

Operations controlled by the main controller 118 include establishing an OTA connection between the RF module 110 and the DUT 140 via the transceiver 112 in the RF module 110 and the antenna 125 in the shield box 120, and determining an average power of a transmitter in the DUT 140 from the power captured by the power detector 116 and provided to the ADC 119. The main controller 118 may establish the OTA connection and determine the average power based on advertising information broadcast by the DUT 140 in accordance with the BLE 5.0 specification and received over at least one advertising channel, while the DUT 140 is in signaling mode (as opposed to non-signaling mode). For example, the main controller 118 may establish the OTA connection with the DUT 140 by receiving the advertising information broadcast by the DUT 140 over the at least one advertising channel in accordance with the BLE 5.0 specification, and sending an advertising connect request to the DUT 140 in response to the advertising information over the at least one advertising channel, via the transceiver 112. The advertising information may include broadcasting information, such as the name of the DUT 140, for example. The DUT 140 may stop broadcasting the advertising information in response to receiving the advertising connect request.

Alternatively, the main controller 118 may establish the OTA connection and determine the average power based on beacon request sent by the DUT 140 in accordance with the ZigBee 3.0 specification and received over one of the channels, while the DUT 140 is in signaling mode (as opposed to non-signaling mode). For example, the main controller 118 may establish the OTA connection with the DUT 140 by receiving one or more unsecured beacon requests sent by the DUT 140 over the channel in accordance with the ZigBee 3.0 specification, and sending a beacon to the DUT 140 in response to the beacon request(s) over the channel, via the transceiver 112. The beacon requests may include connection information, such as the name of the DUT 140, for example. The DUT 140 may stop sending beacon requests in response to receiving the beacon.

The signaling mode is the operational mode of the DUT 140, as a final product, where the non-signaling mode is the test mode, defined by chip manufacturers, as discussed above. In the non-signaling mode, performance and specification of the radio chipset may be tested at the base level, as the protocol stack does not get fully involved. Thus, in the non-signaling mode, basic RF functionality at the chip level only can be tested. However, using the signaling mode, performance of the DUT 140 as final product may be verified, since the full protocol stack will run along with the application of the DUT 140 as a final product. So, testing in the signaling mode, as in the various embodiments described herein, enables verification of the performance of the DUT 140 as the final product (e.g., the same as that received by the end user).

The main controller 118 then generates a BLE Link Layer Connect request, and causes the transceiver 112 to transmit the BLE Link Layer Connect request to the DUT 140 over the at least one data channel. The DUT 140 generates and sends a link layer acknowledgement in response to the BLE Link Layer Connect request. The main controller 118 receives the link layer acknowledgement from the DUT 140 over each of the at least one data channel, respectively, and establishes the OTA connection with the DUT 140 upon receiving the link layer acknowledgement from DUT 140 over each of the at least one data channel Each of the at least one data channel of the OTA connection comprises a radio frequency (RF) OTA link between the DUT 140 and the RF module 110. In an embodiment, the main controller 118 causes the transceiver 112 to send the BLE Link Layer Connect request over all 37 data channels, and to likewise receive the responsive link layer acknowledgement over all 37 data channels. However, the BLE Link Layer Connect request and responsive link layer acknowledgement may be sent and received over fewer than all 37 of the data channels, and still establish the OTA connection, without departing from the scope of the present teachings.

Figure 5:
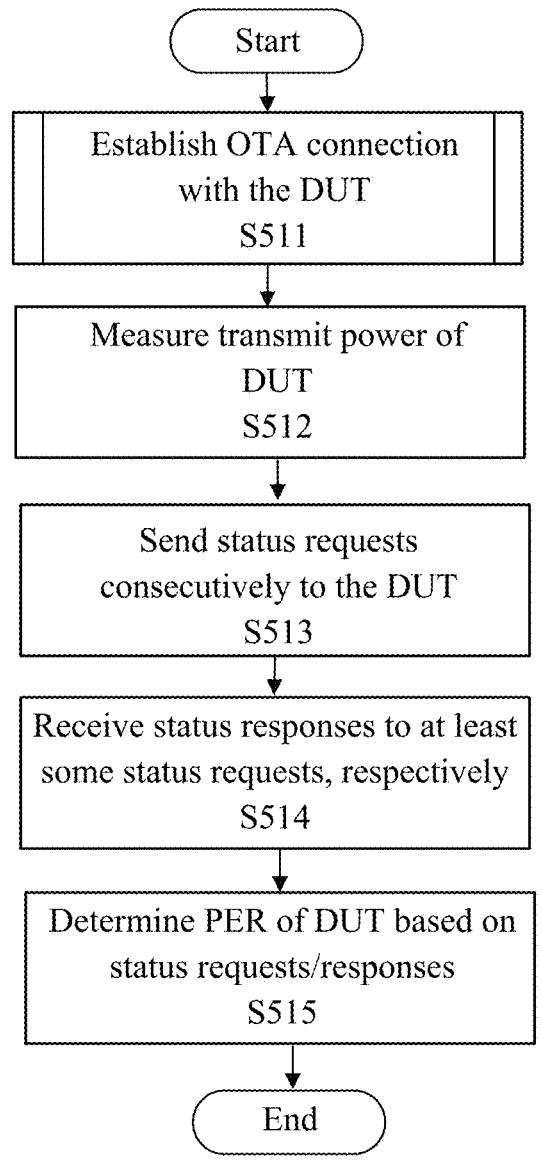
FIG. 5 is a simplified flow diagram of a method for performing OTA testing of a DUT in a ZigBee network, according to a representative embodiment.

More particularly, in an embodiment, it is assumed that the DUT 140 supports the Connectable and Scannable Undirected Event of the advertising event types for broadcasting the advertising transmissions, discussed above. The PDU used by the DUT 140 for the Connectable and Scannable Undirected Event is ADV_IND, in accordance with the BLE 5.0 standard, as shown in FIG. 5. This enables the DUT 140 to operate in signaling mode which enables broadcasting the advertising transmissions, as opposed to the non-signaling mode of operation usually used for testing. For example, the DUT 140 starts the Connectable and Scannable Undirected Event by providing (e.g., broadcasting) an ADV_IND_PDU over the advertising channels. The DUT 140 receives a connection request CONNECT_REQ response PDU in return (e.g., from the main controller 118 in response to the advertised ADV_IND_PDU), which closes the advertising event. Then, the main controller 118 provides a link layer data/control packet (e.g., the BLE Link Layer Connect request), which is transmitted by the transceiver 112 to the DUT 140 over a data channel. The DUT 140 responds with a corresponding link layer data/control packet (e.g., the link layer acknowledgement) for the same data channel, closing that particular connection event. The process is performed for all of the data channels to establish the OTA connection.

Alternatively, in accordance with the ZigBee specification, the main controller 118 receives an Association request from the DUT 140 over the channel. The main controller 118 determines whether to approve the requested association. When the main controller 118 approves the association, it generates an Association response, and causes the transceiver 112 to transmit the Association response to the DUT 140 over the channel. The DUT 140 then joins the network upon receiving the Association response, thus establishing a non-secure network including the test system 100 and the DUT 140. The main controller 118 may then send a link key to the DUT 140 over the channel, and the DUT 140 determines whether there is a key match. If so, the DUT 140 sends an acknowledgement of the link key to the main controller 118, thereby establishing a secure network over the channel. The OTA connection is made with the DUT 140 over the secure network. The main controller 118 may cause the transceiver 112 to change the channel over which the link key and the acknowledgement of the link key are sent (as well as changing the channel used for the previously mentioned communications, such as the beacon requests, the beacon, the Association requests, and the Association responses).

Once the OTA connection is established between the DUT 140 and the RF module 110, the WPAN processor 114 causes the transceiver 112 to transmit routine requests (commands) at different transmit powers to the DUT 140 over at least one channel of the OTA connection. Depending on the respective transmit powers of the requests and the receiver sensitivity of its RF receiver, the DUT 140 is able to receive (detect) at least some of the requests, sending corresponding responses to the detected requests. The WPAN processor 114 may then determine a packet error rate (PER) of the DUT 140 by based on the ratio of the number of received responses and the number of sent requests.

For example, in accordance with the BLE 5.0 specification, the WPAN processor 114 is programmed to cause the transceiver 112 to transmit UUID requests at different transmit powers to the DUT 140 over at least one data channel of the OTA connection. UUIDs are guaranteed to be unique, and can be independently created in a distributed fashion. Each UUID is a 128-bit value. The Bluetooth® SIG has already allocated certain UUIDs as unique for BLE compliant devices. The SIG provides UUIDs for all types, services and profiles defined by the BLE specifications. The UUIDs are assigned to the BLE compliant devices (e.g., DUT 140) at the time of manufacture, and are stored in memories within the respective BLE compliant devices. This enables the BLE compliant devices to provide the respective UUIDs for identification.

Depending on the respective transmit powers of the UUID requests and the receiver sensitivity of its RF receiver, the DUT 140 is able to receive (detect) at least some of UUID requests. That is, the DUT 140 receives only the UUID requests that have been transmitted at a high enough power for the RF receiver of the DUT 140 to detect. The higher the receiver sensitivity, the more UUID requests the DUT 140 is able to detect (e.g., in response to lower transmit powers). In various embodiments, a predetermined number of the UUID requests may be sent to the DUT 140 over the at least one data channel of the OTA connection. For example, the RF module 110 may send out one or more UUID requests, and the DUT 140 may detect any number from all of them to none of them, depending on receiver sensitivity.

The DUT 140 responds to the detected UUID requests by sending corresponding UUID responses, which are received by the transceiver 112 and provided to the WPAN processor 114 in the RF module 110. The UUID responses are received over the at least one data channel of the OTA connection. The WPAN processor 114 determines the PER of the UUID requests based on a ratio of a number (M) of received UUID responses and a number (N) of sent UUID requests, where the determined PER indicates the sensitivity of the receiver in the DUT 140. For example, the WPAN processor 114 may determine the PER by determining a difference between one (1) and the ratio of the number of received UUID responses and the number of sent UUID requests, and multiplying the determined difference by one hundred (100), thereby obtaining a percentage PER.

Alternatively, in accordance with the ZigBee 3.0 specification, the WPAN processor 114 is programmed to cause the transceiver 112 to transmit status requests at different transmit powers to the DUT 140 over the channel used for the OTA connection. The status requests are sent to a unique identifier associated with the DUT 140, as allocated by the ZigBee Alliance for ZigBee compliant devices. The unique identifier may be received as a network layer package by the WPAN processor 114 via the OTA connection in response to a request for the same. The ZigBee Alliance provides identifiers for all types, services and profiles defined by the ZigBee specifications, which identifiers are assigned to the ZigBee compliant devices (e.g., DUT 140) at the time of manufacture, and are stored in memories within the respective ZigBee compliant devices.

Depending on the respective transmit powers of the status requests and the receiver sensitivity of its RF receiver, the DUT 140 is able to receive (detect) at least some of status requests. That is, the DUT 140 receives only the status requests that have been transmitted at a high enough power for the RF receiver of the DUT 140 to detect. The higher the receiver sensitivity, the more status requests the DUT 140 is able to detect (e.g., in response to lower transmit powers). In various embodiments, a predetermined number of the status requests may be sent to the DUT 140 over the channel of the OTA connection. For example, the RF module 110 may send out one or more status requests, and the DUT 140 may detect any number from all of them to none of them, depending on receiver sensitivity.

The DUT 140 responds to the detected status requests by sending corresponding status responses (e.g., each comprising a unique address or identifier of the DUT 140), which are received by the transceiver 112 and provided to the WPAN processor 114 in the RF module 110. The status responses are received over the channel of the OTA connection. The WPAN processor 114 determines the PER of the status requests based on a ratio of a number (M) of received status responses and a number (N) of sent status requests, where the determined PER indicates the sensitivity of the receiver in the DUT 140, as discussed above.

The test system 100 may further include a test computer 130 electrically connected to the RF module 110 via an interface (not shown). The test computer 130 is programmed to provide a user interface, such as a graphical user interface (GUI), between the RF module 110 and a user. For example, the test computer 130 may display the identity of the DUT 140 (e.g., type, model, manufacturer, properties of the device), the receiver sensitivity of the receiver in the DUT 140, and the average power of the advertising signals from the transmitter of the DUT 140.

The test computer 130 may also receive input from the user through any of various types of compatible input devices, such as a keyboard, a mouse, and/or a touch screen, for example. The input may control various operations of the RF module 110, such as the number of UUID requests and/or status requests sent to the DUT 140 and the power level of each such request. Also, the test computer 130 may be programmed to run the testing process, where the user may choose the type and parameters of the testing process, and the test computer 130 may report test results. For example, the user may set various measurement parameters, such as RF path loss, number of test packets, type of test (e.g., BLE and/or ZigBee) and the like. Measurement parameters may be set directly using a driver with the user's own test application or using a commercially available plug-in, such as Test Application Platform (TAP), from Keysight Technologies, Inc., for example, to perform the measurements. Also, test results (PER, DUT transmit power, DUT receiver sensitivity, etc.) may be stored in test computer 130. The input may also enable control of aspects of the GUI itself, such as selecting among displays, selecting and creating graphical representations, table and/or charts of information collected and/or determined regarding the DUT 140 and performance thereof.

Generally, each of the WPAN processor 114, the main controller 118, and the test computer 130 may be implemented by one or more computer processors, field-programmable gate arrays (FPGAs), application specific integrated circuits (ASICs), or combinations thereof, using software, firmware, hard-wired logic circuits, or combinations thereof. A computer processor, in particular, may be constructed of any combination of hardware, firmware or software architectures, and may include its own memory (e.g., nonvolatile memory) for storing executable software/firmware executable code that allows it to perform the various functions. In an embodiment, the computer processor may comprise a central processing unit (CPU), for example, executing an operating system. The test computer 130, in particular, may be implemented using a personal computer (PC), for example.

Each of the WPAN processor 114, the main controller 118, and the test computer 130 may be in communication with respective memory (not shown) that stores information regarding BLE 5.0 requirements, the RF module 110 and/or the DUT 140, for example. The memor(ies) may also store information and processing results (e.g., regarding receiver sensitivity and transmitter power of the DUT 140), enabling the information to be recalled, if needed. The memor(ies) may be implemented by any number, type and combination of random access memory (RAM) and read-only memory (ROM), for example, and may store various types of information, such as computer programs and software algorithms executable by the WPAN processor 114, the main controller 118, and/or the test computer 130. The ROM and RAM may include any number, type and combination of computer readable storage media, such as a disk drive, disk storage, flash memory, electrically programmable read-only memory (EPROM), electrically erasable and programmable read only memory (EEPROM), a universal serial bus (USB) drive, a CD, a DVD, and the like, which are tangible and non-transitory storage media (e.g., as compared to transitory propagating signals).

Figure 2:
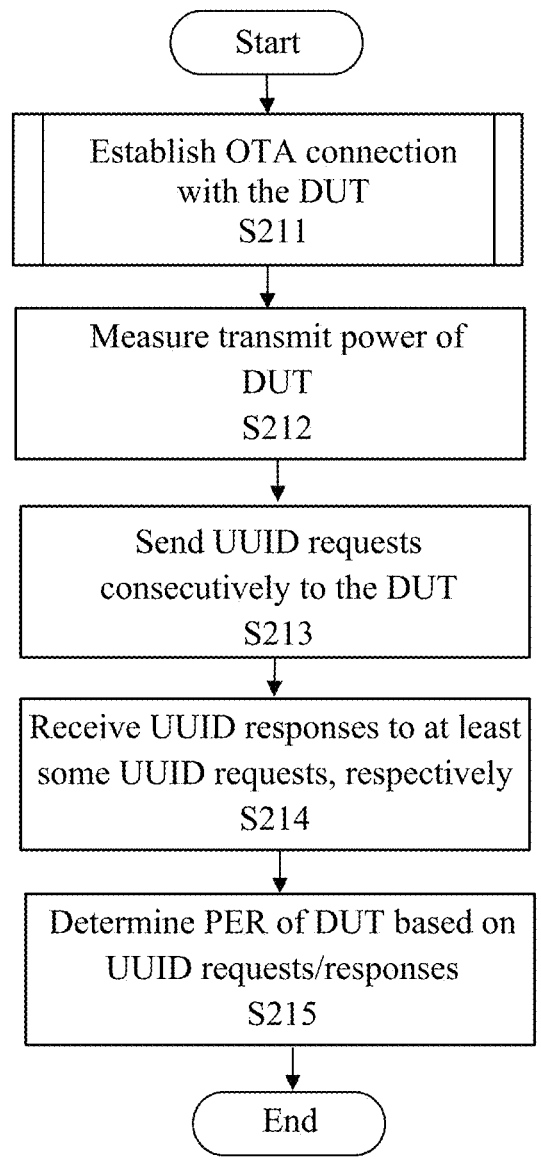
FIG. 2 is a simplified flow diagram of a method for performing OTA testing of a DUT in a BLE network, according to a representative embodiment.

FIG. 2 is a simplified flow diagram of a method for performing OTA testing of a DUT in a BLE network, according to a representative embodiment. The method may be implemented by the test system 100, for example, described above with reference to FIG. 1.

Referring to FIG. 2, block S211 indicates a process for establishing an OTA connection with the DUT (e.g., DUT 140). The DUT is in signaling mode while the OTA is being established. The OTA connection may be established between the DUT and an RF module (e.g., RF module 110), and includes at least one advertising channel and at least one data channel of the DUT. The advertising and data channels may be implemented in accordance with the BLE 5.0 specification, which provides for three advertising channels and 37 data channels, as discussed above.

Figure 3:
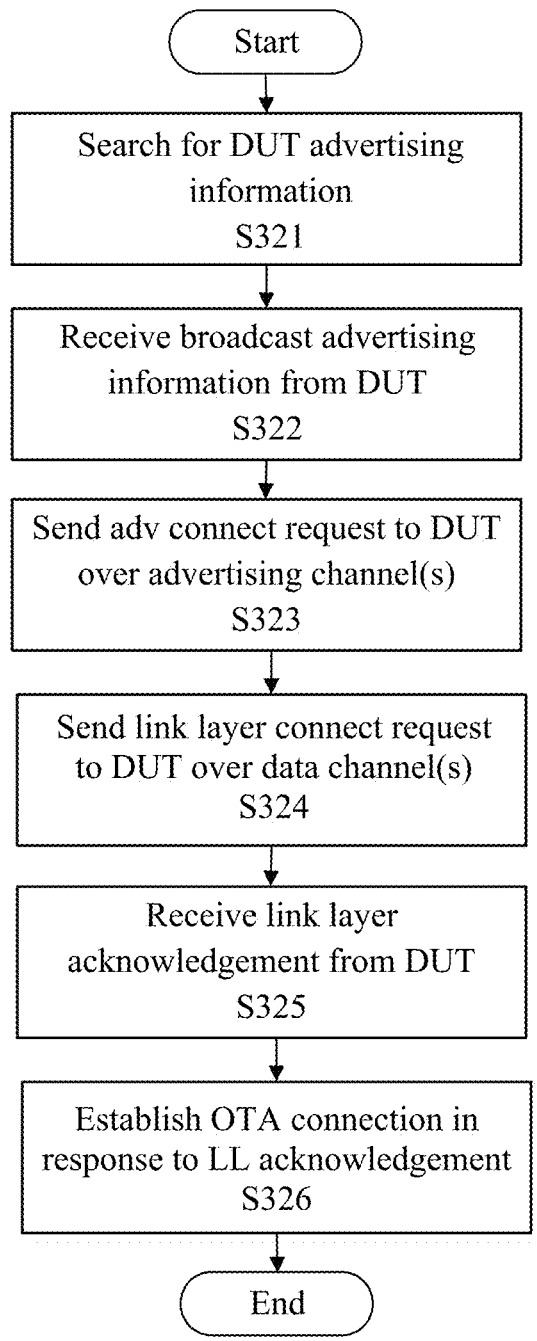
FIG. 3 is a simplified flow diagram of an illustrative process, indicated in FIG. 2, for establishing an OTA connection with the DUT in a BLE network, according to a representative embodiment.

FIG. 3 is a simplified flow diagram of an illustrative method for establishing the OTA connection with the DUT in the BLE network, indicated by the process of block S211, according to a representative embodiment. Referring to FIG. 3, in block S321, the method includes searching for an available DUT, where the DUT broadcasts advertising information over each of the at least one advertising channel, e.g., in accordance with the BLE 5.0 specification. In an embodiment, an event type of the advertising information broadcast by the DUT is a Connectable and Scannable Undirected Event, in accordance with the BLE 5.0 specification, so that the DUT is able to broadcast the advertising information in the signaling mode. Once discovered, the broadcast advertising information is received from the DUT in block S322, e.g., by the RF module 110. In block S323, an advertising connect request is sent to the DUT in response to the advertising information over the at least one advertising channel through which the advertising information was received. The DUT stops the broadcast of the advertising information in response to receiving the advertising connect request. In block S324, a BLE Link Layer Connect request is sent to the DUT over each of the at least one data channel of the DUT. A link layer acknowledgement is received from the DUT in block S325 over each of the at least one data channel in response to the BLE Link Layer Connect request, respectively. The OTA connection with the DUT is established in block S326 upon receiving the link layer acknowledgement from DUT over each of the at least one data channel.

Referring again to FIG. 2, in block S212, transmit power of a transmitter in the DUT may be measured, for example, by capturing average power of the advertising information broadcast by the DUT over the at least one advertising channel using a power detector (e.g., power detector 116). Thus, the transmit power may be performed anytime while the DUT is transmitting and the RF module is receiving broadcast advertising information.

Once the OTA connection is established according to the process of block S211, UUID requests are sent consecutively to the DUT (e.g., under control of the WPAN processor 114) over the at least one data channel of the OTA connection in block S213. The UUID may be previously associated with and unique to the DUT. In block S213, the UUID requests are sent by the RF module transceiver (e.g., transceiver 112) at different transmit powers, respectively, in order to determine the receiver sensitivity of the DUT. For example, each of the UUID requests may be sent at decreasing transmit powers, and at some power level, the DUT receiver will no longer be able to receive the UUID requests. In block S214, UUID responses are consecutively received from the DUT in response to at least some of the UIDD requests over the same at least one data channel of the OTA connection over which the UUID requests were sent. The PER of the DUT may then be determined in block S215 based on a ratio of the number of received UUID responses and the number of sent UUID requests, as discussed below in more detail.

FIG. 5 is a simplified flow diagram of a method for performing OTA testing of a DUT in a ZigBee network, according to a representative embodiment. The method may be implemented by the test system 100, for example, described above with reference to FIG. 1.

Referring to FIG. 5, block S511 indicates a process for establishing an OTA connection with the DUT (e.g., DUT 140), considered a ZigBee Router or End Device. The DUT is in signaling mode while the OTA is being established. The OTA connection may be established between the DUT and an RF module (e.g., RF module 110), considered a ZigBee Coordinator. The OTA connection includes one of the fixed channels of the DUT, which may be implemented in accordance with the ZigBee 3.0 specification, The ZigBee 3.0 specification provides for 16 fixed channels, as discussed above.

Figure 6:
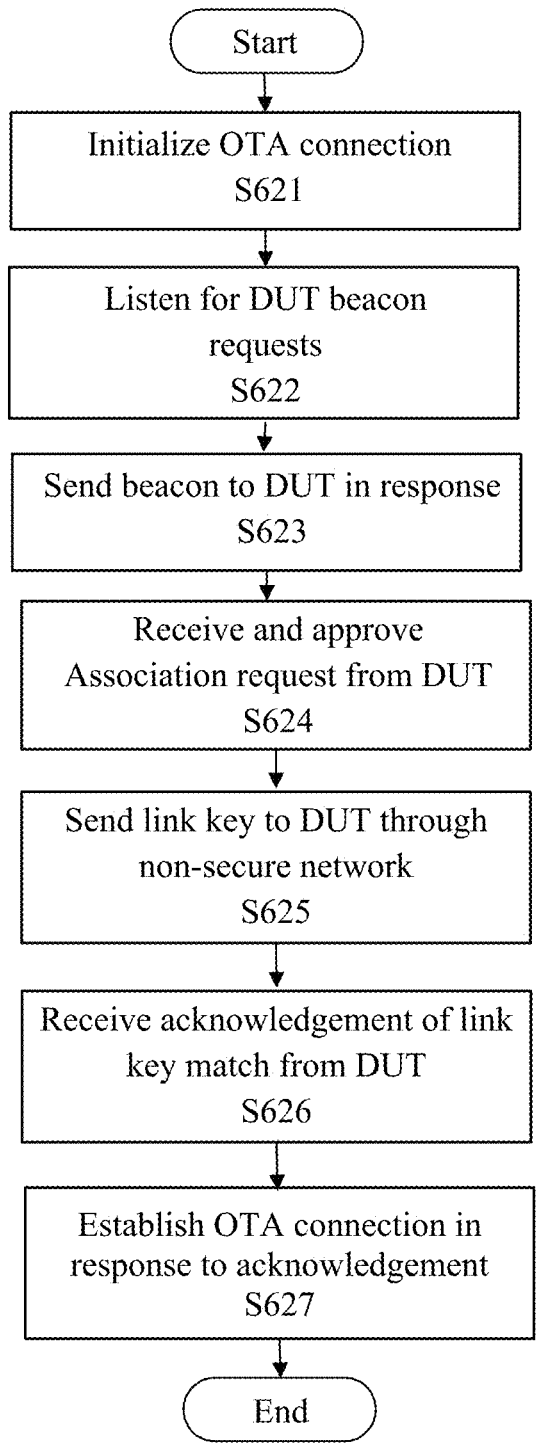
FIG. 6 is a simplified flow diagram of an illustrative process, indicated in FIG. 2, for establishing an OTA connection with the DUT in a ZigBee network, according to a representative embodiment.

FIG. 6 is a simplified flow diagram of an illustrative method for establishing the OTA connection with the DUT in the ZigBee network, indicated by the process of block S511, according to a representative embodiment. Referring to FIG. 6, the connection process is initialized in block S621, after erasing previously associated device lists from flash memory, by setting a coordinator profile (e.g., for the RF module 110), specifying a PAN ID, defining a channel for the OTA connection, and setting a cluster ID. In block S622, the test system listens for beacon requests from the DUT over the channel, e.g., in accordance with the ZigBee 3.0 specification. In an embodiment, the channel for the OTA connection may be the channel used by the DUT to send the beacon requests, although the channel may be changed for these connections, as mentioned above. The beacon requests may be sent in the signaling mode. A beacon is sent to the DUT in response to a detected beacon request in block S623.

Once the DUT receives the beacon, it sends an Association request, which is received and approved in block S624 (e.g., by the RF module 110). Approval of the Association request establishes a non-secure network that includes the RF module, the DUT (which is permitted to join the network), and the channel Approval of the Association request depends on whether the Coordinator (e.g., the RF module 110) determines whether to accept the Association request. This determination is a service provided by the IEEE 802.15.4 MAC sub-layer used to establish membership in a network, e.g., in accordance with the ZigBee 3.0 specification. /If the Association request from the DUT is not approved, the process returns to block S622, and the RF module begins listening for beacon requests from another DUT.

In block S625, a link key is sent to the DUT via the channel through the non-secure network. The link key may be a key specified by the ZigBee Alliance and shared between two peer application-layer entities, such as the RF module and the DUT, within the PAN. The DUT determines whether its link key matches the link key sent by the RF module through the OTA connection. If there is no match, it is not possible to determine the PER, so the process ends. If the link key matches, the DUT sends an acknowledgement of the line key, which is received by the RF module in block S626. Receipt of the link key acknowledgement changes the non-secure network to a secure network, including the RF module, the DUT and the channel. The OTA connection with the DUT is established through the secure network in block S627 in response to receiving the link key acknowledgement from DUT over the channel.

Referring again to FIG. 5, in block S512, transmit power of a transmitter in the DUT may be measured, for example, by capturing average power of the beacon request sent by the DUT over the channel using a power detector (e.g., power detector 116). Thus, the transmit power may be performed anytime while the DUT is transmitting and the RF module is receiving the beacon requests.

Once the OTA connection is established according to the process of block S511, status requests are sent consecutively to the DUT (e.g., under control of the WPAN processor 114) over the channel of the OTA connection in block S513. The status requests may be in accordance with ZigBee 3.0 specification. In block S513, the status requests are sent by the RF module transceiver (e.g., transceiver 112) at different transmit powers, respectively, in order to determine the receiver sensitivity of the DUT. For example, each of the status requests may be sent at decreasing transmit powers, and at some power level, the DUT receiver will no longer be able to receive the status requests. In block S514, status responses are consecutively received from the DUT in response to at least some of the status requests over the same channel of the OTA connection over which the status requests were sent. The PER of the DUT may then be determined in block S515 based on a ratio of the number of received status responses and the number of sent status requests, as discussed below in more detail.

Figure 7:
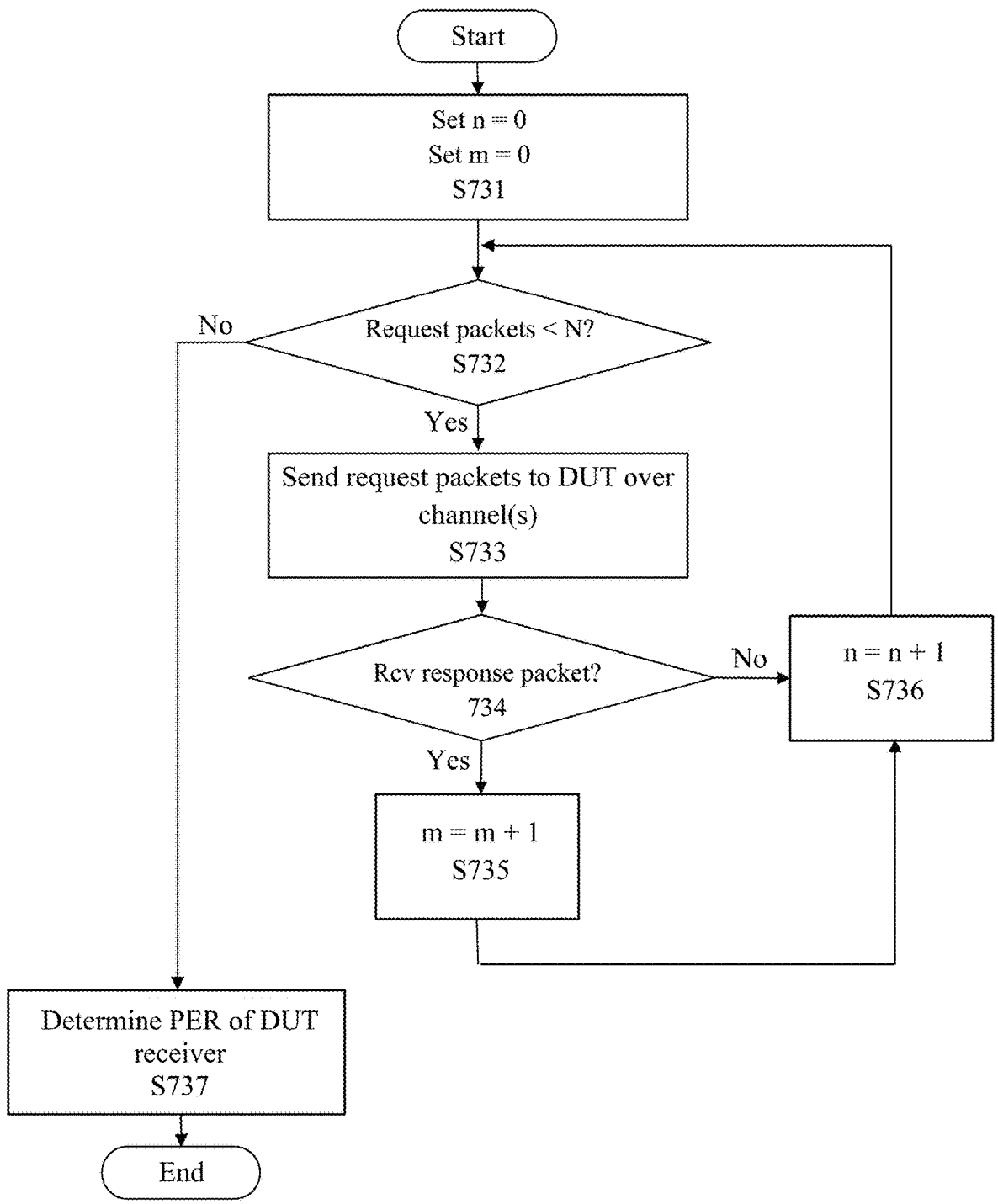
FIG. 7 is a simplified flow diagram of an illustrative process, indicated in FIGS. 2 and 5, for determining PER of the DUT, according to a representative embodiment.

FIG. 7 is a simplified flow diagram of an illustrative process, indicated in FIGS. 2 and 5, for determining PER of the DUT in either a BLE network or a ZigBee network, according to representative embodiments. More particularly, FIG. 7 depicts in more detail an example of a process for determining PER after the OTA connection has been established between the RF module and the DUT (e.g., the portion of the process indicated in blocks S213 to S215 of FIG. 2 and in blocks S513 to S515 of FIG. 5).

Referring to FIG. 7, in block S731, the number n of request packets sent to the DUT (e.g., UUID requests or status requests) is set to zero, and the number m of response packets received from the DUT (e.g., UUID responses or status responses) is set to zero, where n and m are positive integers. In step S732, it is determined whether the number n of request packets sent to is less than N, where N is a positive integer indicating a predetermined number of the request packets to be sent to the DUT during the testing process. When the number n of request packets is less than N (S732: Yes), a request packet is sent at a corresponding transmit power to the DUT in block S733 over the at least one channel of the OTA connection, where the transmit power is different for each request packet (or set of request packets) that is sent. In block S734, it is determined whether a corresponding response packet is received from the DUT in response to the sent request packet. The response packet would be received over the same at least one channel of the OTA connection over which the request packet was sent. When a response packet is received (S734: Yes), the number m of response packets is incremented by one in block S735, and the number n is incremented by one in block S736. When a response packet is not received (S734: No), the number m is not incremented, and only the number n is incremented by one in block S736. The process then returns block S732, and repeated.

Referring again to block S732, when the number n of request packets is not less than N (S732: No) (e.g., n=N), the method proceeds to block S737 for determining the receiver sensitivity in the DUT based on the sent request packets and corresponding received response packets from the DUT. For example, a PER of the DUT may be determined based on a ratio of a number of received response packets and a number of sent request packets. A percentage PER may be determined, for example, by Equation (1):

$$PER = (1 - m/N) * 100 \quad \text{Equation} \quad (1)$$

The percentage PER is used to determine the receiver sensitivity in that the higher the ratio of response packets received in response to corresponding request packets (transmitted at different power levels), the more sensitive the receiver is. That is, the more response packets received by the RF module indicates the ability of the DUT receiver to detect the request packets at lower power levels. By taking the difference between this ratio and one indicates the level of errors (undetected request packets) incurred by the DUT receiver.

Accordingly, testing of a DUT may be performed through an OTA connection, without having to access test points. The OTA connection may be established and the testing may be performed using commands from known WPAN standards, such as BLE and/or ZigBee. For example, receiver sensitivity of the DUT may be tested by sending specified commands at different transmit powers and receiving corresponding responses to at least some of the commands, where the greater the number of received responses in relation to the number of sent commands indicates a higher receiver sensitivity.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed:

1. A method of performing over-the-air (OTA) testing of a device under test (DUT), the method comprising:
   establishing an OTA connection with the DUT, while the DUT is in signaling mode, the OTA connection comprising at least one advertising channel and at least one data channel of the DUT;
   sending universally unique identifier (UUID) requests at different transmit powers to the DUT over the at least one data channel of the OTA connection, the UUID request including a UUID previously associated with the DUT;
   receiving UUID responses from the DUT over the at least one data channel of the OTA connection in response to at least some of the UUID requests; and
   determining a packet error rate (PER) for the received UUID responses from the DUT based on a ratio of a number of received UUID responses and a number of sent UUID requests, the determined PER indicating sensitivity of a receiver in the DUT.

2. The method of claim 1, wherein each of the at least one data channel of the OTA connection comprises a radio frequency (RF) link.

3. The method of claim 1, wherein the DUT complies with Bluetooth® Low Energy (BLE) 5.0 specification, and
   wherein establishing the OTA connection with the DUT comprises:
      receiving advertising information broadcast by the DUT over the at least one advertising channel of the DUT in accordance with the BLE 5.0 specification;
      sending an advertising connect request to the DUT in response to the advertising information over the at least one advertising channel through which the advertising information was received, the DUT stopping the broadcast of the advertising information in response to the advertising connect request;

sending a BLE Link Layer Connect request to the DUT over each of the at least one data channel;

receiving a link layer acknowledgement from the DUT over each of the at least one data channel in response to the BLE Link Layer Connect request, respectively; and establishing the OTA connection with the DUT upon receiving the link layer acknowledgement from DUT over each of the at least one data channel.

4. The method of claim 3, wherein an event type of the advertising information broadcast by the DUT is a Connectable and Scannable Undirected Event in accordance with the BLE 5.0 specification.

5. The method of claim 3, wherein the at least one advertising channel comprises channels 37, 38 and 39 in accordance with the BLE 5.0 specification.

6. The method of claim 3, wherein the at least one data channel comprises channels 0 to 36 in accordance with the BLE 5.0 specification, and wherein data channels are selected by an adaptive frequency hopping mechanism used on top of the channels 0 to 36.

7. The method of claim 3, further comprising:

measuring a transmit power of a transmitter in the DUT by capturing average power of the advertising information broadcast by the DUT over the at least one advertising channel.

8. The method of claim 1, wherein determining the PER of the DUT comprises determining a difference between one (1) and the ratio of the number of received UUID responses and the number of sent UUID requests, and multiplying the determined difference by one hundred (100).

9. A test system for performing over-the-air (OTA) testing of a device under test (DUT), the system comprising:

a shield box containing at least a coupling antenna for communicating radio frequency (RF) signals OTA with the DUT when located within the shield box; and a radio frequency (RF) module electrically connected to the antenna in the shield box, the RF module comprising:

a transceiver for sending and receiving RF signals to and from the antenna in the shield box via an OTA connection with the DUT, the RF signals including advertising information broadcast by the DUT over at least one advertising channel, universally unique identifier (UUID) requests sent to the DUT over at least one data channel of the OTA connection, and UUID responses received from the DUT in response to at least some of the UUID requests over the at least one data channel of the OTA connection;

a main controller programmed to control operations of the RF module, including:

establishing the OTA connection between the transceiver and the DUT via the antenna in the shield box based on the advertising information received over the at least one advertising channel, while the DUT is in signaling mode; and a wireless personal area network (WPAN) processor programmed to execute a receiver sensitivity measurement of a receiver in the DUT, corresponding to BLE 5.0 specification, including:

causing the transceiver to send the UUID requests at different transmit powers to the DUT over the at least one data channel of the OTA connection, receiving UUID responses from the DUT over the at least one data channel of the OTA connection in response to at least some of the UIDD requests, and determining a packet error rate (PER) of the UUID requests based on a ratio of a number of received UUID responses and a number of sent UUID requests, the determined PER indicating sensitivity of a receiver in the DUT.

10. The system of claim 9, further comprising:

a test computer electrically connected to the RF module, the test computer being programmed to provide a graphical user interface between the RF module and a user, and to display the receiver sensitivity of the receiver in the DUT.

11. The system of claim 9, wherein the RF module is a Keysight X8711A IoT Device Functional Test Solution.

12. The system of claim 9, wherein the main controller establishes the OTA connection with the DUT by:

receiving the advertising information broadcast by the DUT over the at least one advertising channel in accordance with the BLE 5.0 specification;

sending an advertising connect request to the DUT in response to the advertising information over the at least one advertising channel, the DUT stopping the broadcast of the advertising information in response to the advertising connect request;

causing the transceiver to send a BLE Link Layer Connect request to the DUT over the at least one data channel;

receiving a link layer acknowledgement from the DUT over each of the at least one data channel in response to the BLE Link Layer Connect request, respectively; and establishing the OTA connection with the DUT upon receiving the link layer acknowledgement from DUT over each of the at least one data channel.

13. The system of claim 9, wherein the WPAN processor is programmed to determine the PER of the UUID requests by determining a difference between one (1) and the ratio of the number of received UUID responses and the number of sent UUID requests, and multiplying the determined difference by one hundred (100).

14. The system of claim 9, wherein the RF module is electrically connected to the antenna via a SMA cable.

15. The system of claim 9, wherein the RF module further comprises a power detector for providing DC voltage signals indicating levels of power of the RF signals including the advertising information, and wherein the main controller comprises an ADC for receiving and converting the DC voltage signals to digital signals, enabling determination of average power of a transmitter in the DUT.

16. The system of claim 15, wherein the WPAN processor and the main controller are synchronized using a sync signal output by the WPAN processor, activating the ADC of the main controller in response to an event initiated by the WPAN processor.

17. A method of performing over-the-air (OTA) testing of a device under test (DUT), the method comprising:

establishing an OTA connection with the DUT, while the DUT is in signaling mode, the OTA connection comprising a fixed channel of the DUT;

sending status requests at different transmit powers to the DUT over the fixed channel of the OTA connection, the status request being sent to a unique identifier associated with the DUT;

receiving status responses from the DUT over the fixed channel of the OTA connection in response to at least some of the status requests; and determining a packet error rate (PER) for the received status responses from the DUT based on a ratio of a number of received status responses and a number of sent status requests, the determined PER indicating sensitivity of a receiver in the DUT.

18. The method of claim 17, wherein the DUT complies with ZigBee 3.0 specification, and wherein establishing the OTA connection with the DUT comprises:

listening for a beacon request transmitted by DUT over the fixed channel in accordance with the ZigBee 3.0 specification;

sending a beacon to the DUT in response to the beacon request;

receiving and approving an Association request from the DUT over the fixed channel, thereby establishing a non-secure network including the DUT and the fixed channel;

sending a link key to the DUT through the non-secure network;

receiving a link key acknowledgement from the DUT through the non-secure network after the DUT determines a key match, establishing a secure network; and establishing the OTA connection with the DUT through the secure network upon receiving the link key acknowledgement.

19. The method of claim 18, further comprising:

measuring a transmit power of a transmitter in the DUT by capturing average power of the beacon request sent by the DUT over the fixed channel.

20. The method of claim 17, wherein determining the PER of the DUT comprises determining a difference between one (1) and the ratio of the number of received status responses and the number of sent status requests, and multiplying the determined difference by one hundred (100).

* * * * *